United States Patent [19]

Sanctuary et al.

[11] Patent Number: 4,813,877
[45] Date of Patent: Mar. 21, 1989

[54] REMOTE STRAFE SCORING SYSTEM

[75] Inventors: Clifford Sanctuary, La Conner, Wash.; Sean Amour, San Diego; Shao-Rong R. Hsieh, Costa Mesa, both of Calif.

[73] Assignee: Del Mar Avionics, Irvine, Calif.

[21] Appl. No.: 77,510

[22] Filed: Jul. 24, 1987

[51] Int. Cl.⁴ ............................................. G01S 5/18
[52] U.S. Cl. ......................................... 434/14; 434/19
[58] Field of Search ....................... 434/14, 19, 20, 21, 434/22; 367/127, 906

[56] References Cited

U.S. PATENT DOCUMENTS

| | | | |
|---|---|---|---|
| 2,878,589 | 3/1959 | Mongello | 434/14 |
| 3,445,808 | 5/1969 | Johnson | 367/127 |
| 3,627,323 | 12/1971 | Bozich | 434/14 |
| 3,707,699 | 12/1972 | Sanctuary | 367/127 |
| 3,778,059 | 12/1973 | Rohrbaugh | 434/19 |
| 4,273,536 | 6/1981 | Wick | 434/14 |

Primary Examiner—Leo P. Picard
Attorney, Agent, or Firm—W. D. English

[57] ABSTRACT

A remote scoring system for an air-to-ground strafing range is disclosed which utilizes a pair of vector sensors for each target to pinpoint a target hit and/or miss by means of shell shock wave amplitude and time of arrival (TOA) differentials of the shock wave between the two sensors. The invention also encompasses at least one down range cease-fire sensor that utilizes a TOA of the shell shock wave and its respective muzzle blast to determine a ceasefire distance from the target. Unique signal processing of data is designed for immediate display and/or printout.

10 Claims, 13 Drawing Sheets

DATE: 07-27-87  
TIME: 11:16  
AIRCRAFT: F16  
PILOT: TM  
AIRCRAFT SPEED: 450 KNOTS  
WIND SPEED: 10 KNOTS  
WIND DIRECTION: N.W. 10:30

NUMBER OF HITS: 5  
NUMBER OF MISSES: 14  
TOTAL ROUNDS FIRED: 23  
CEASEFIRE DISTANCE: 4200 FT  
SALVO CENTER: 18FT @ 02:30

REMOTE STRAFE SCORING SYSTEM

BACKGROUND OF THE INVENTION

1. Field of the Invention

The invention lies in the field of strafe scoring, whereby projectiles fired by an aircraft at a ground target are scored to determine whether the target was hit, or by how far and in which direction it was missed. Also determined are the number of projectiles fired by the aircraft during a particular firing pass, and the distance from the target that the aircraft fired its last round of each pass.

2. Description of the Prior Art

Military fighter aircraft training of pilots for strafing of ground targets is conducted on what are known ad "Controlled Ranges." On these ranges, a visual target, originally a cloth banner 20-foot square, and more recently, a circular cloth target made from a used drag parachute, is hung between two poles. The pilot of the fighter aircraft under training flies down a specific approach path and fires a strafe weapon, usually either a 20-mm or a 30-mm cannon, at the target. He must normally have ceased firing at a range of 2,000 feet or more from the target.

When the 20-foot square banner was used, the number of hits on the target was determined by lowering the target and counting the number of holes made by the projectiles.

More recently, when using the drag parachute as a target, scoring the number of hits is determined by use of an acoustic scoring system. With this system, a microphone is placed directly in front of the target and the amplitude of the acoustic shock waves of the passing projectiles are measured. Each type of different projectile has its own shock wave characteristics. By knowing the characteristics, a specific amplitude for a specific miss distance was determined for each type of projectile. The acoustic scoring system counts the number of projectiles passing within a specific distance of the microphone (typically 17 feet) for each aircraft firing pass and calls these hits on the target.

The existing method of determining a cease-fire distance from the aircraft to the target is by an observer on the ground at a point 2,000 feet from the target estimating the cease-fire distance by visually watching the cessation of the smoke from the aircraft cannon.

Although prior art remote scoring systems provided a reasonable method of strafe scoring, considering existing state of the art, there remains a long standing and continuing need for a more efficient, more accurate and more simplified approach without inherent disadvantages of the present scoring system, a few of which are: the existing system only estimates hits on the target by use of but one sensor and therefore does not pinpoint the locations of hits and/or misses, nor the total rounds fired; the acoustic sensor is situated directly in front of the target and has to be protected by a berm which is subject to major damage and maintenance; and the cease-fire range is a very inaccurate visual estimation.

The present invention overcomes all the disadvantages of the existing system by providing the number of hits in any preselected target shape; by determining the number and location of the projectiles which missed the target, by placing the acoustic sensor from the center of the target area to a safe position at one side, and by providing an automatic measurement of the cease-fire distance from the aircraft to the target.

The Strafe Scoring System disclosed herein provides a new, novel, unobvious and useful approach to using strategically placed acoustic sensors and signal porcessing equipment to solve the disadvantages of the prior art.

SUMMARY OF THE INVENTION

The invention is a remote scoring system for a strafing range. The strafing range, divided into a left and a right range, utilizes four targets, two inner and two outer targets with a pair of acoustic vector sensors, a high sensor and a low sensor, associated with each target. The vector sensors utilize a shock wave amplitude (SWA) and a time of arrival (TOA) differential of the shock wave to determine the penetration point of a round in a target (a hit) and in a fifty foot radius of the target (a near miss). A pair of cease-fire, acoustic sensors (one for distant strafe and one for short strafe) are centrally positioned down range and utilize the TOA differential at a single sensor between a shell shock wave and its respective muzzle blast to determine a cease-fire distance. Signal processing equipment situated remotely from the target plane provides a visual display and/or readout of strafing results about three seconds after cessation of the strafe.

OBJECT OF THE INVENTION

It is therefore an object of the invention to provide a remote scoring system to support air to ground strafe training missions. A further object is to provide an improved acoustic scoring technique to permit increased accuracy in scoring target hits and near misses in a preselected target area for remote display of data at a range control tower.

Yet another object is to utilize a pair of acoustic sensors, acting as vector sensors, to determine, via SWA and TOA differentials, polar coordinates, radius and angle, of the spot in a target and a 50 foot radius of the target where a round penetrated.

Yet a further object is to utilize the TOA differential of a shell shock wave and its respective muzzle blast of a single down range acoustic sensor to determine the point at which an aircraft ceased firing.

Yet another object is to provide a total count of rounds fired in a particular strafe exercise.

Still another object is to utilize acoustic sensors that are safely positioned out of the line of fire.

These and other objectives, features and advantages of the disclosed invention will become more readily apparent upon reading the following detailed description of the preferred embodiment in view of the accompanying drawings and appended claims.

DESCRIPTION OF THE PREFERRED EMBODIMENT

Figure 1:
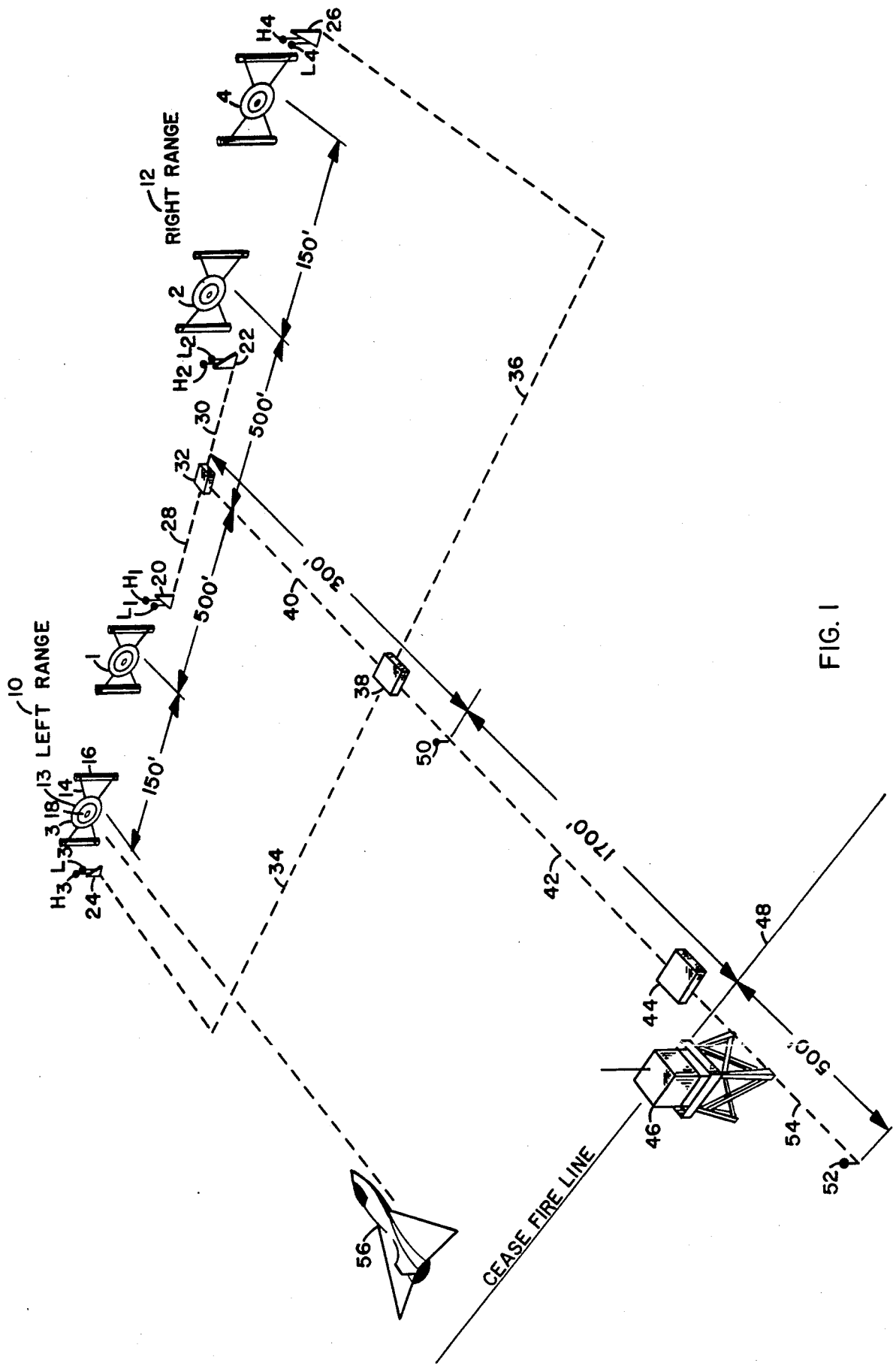
FIG. 1 illustrates an overview of the remote acoustic scoring system.

FIG. 1 illustrates an overview of a typical strafing range in which the invention would be used. Although the claims, infra, and the following detailed description in part will relate to and describe the invention in terms of a single target for purposes of simplified illustration and explanation, the preferred embodiment actually utilizes four interrelated targets lying in a plane in two ranges. Said four targets, as illustrated in FIG. 1, are more particularly designated as a left range inner target 1 positioned approximately 1,000 feet from a right range inner target 2, and a left range outer target 3, positioned approximately 1,300 feet from a right range outer target 4. Targets 1 and 3 lie in a left range 10 and targets 2 and 4 lie in a right range 12. Referring now to target 3, but applicable to all other targets, target 3 may typically be a surplus parachute 13 stretched out and tilted to a vertical plane from the ground and is suspended by four lines 14 extending between two tilted posts 16. A bull's eye design 18 or other desirable target illustration may be embellished on the surface of target 3 for variable strafing and accuracy needs and orientations.

A pair of vector sensors associated with each target consists of a high (H) sensor and a low (L) sensor as follows: a left range inner target vector sensor pair $H_1$ and $L_1$ on an incline 20, a right range inner target vector sensor pair $H_2$ and $L_2$ on an incline 22, a left range outer target vector sensor pair $H_3$ and $L_3$ on an incline 24, and a right range outer target vector sensor pair $H_4$ and $L_4$ on an incline 26, associated with targets 1, 2, 3 and 4, respectively.

Referring now to left range outer target vector sensor pair $H_3$ and $L_3$, but applicable to all other vector sensor pairs, vector sensor pair $H_3$ and $L_3$ consist of a high vector sensor $H_3$ and a low vector sensor $L_3$ spaced approximately two feet apart on incline mount 24 in a plane parallel to the plane of target 3, with high vector sensor $H_3$ slightly elevated with respect to low vector sensor $L_3$. Vector sensor pairs $H_1/L_1$, $H_2/L_2$, $H_3/L_3$ and $H_4/L_4$ may be acoustic sensors and are designed and oriented to determine exactly where a shell penetrates targets 1, 2, 3 and 4 respectively, and/or the circular area around each said target to a radius of approximately fifty feet from the center thereof by means of a shock wave amplitude (SWA) and time of arrival (TOA) differential of a shock wave between the H sensor and the L sensor of each target.

Inner vector sensor pairs $H_1/L_1$ and $H_2/L_2$, are coupled via buried cable 28 and 30, respectively, to an inner cable junction box 32 positioned midway between targets 1 and 2. Outer vector sensor pairs $H_3/L_3$ and $H_4/L_4$ are coupled via buried cable 34 and 36, respectively, to an outer cable junction box 38. Inner cable junction box 32 is coupled by a buried cable 40 to outer cable junction box 38 which in turn is coupled by a buried cable 42 to a control tower junction box 44 which in turn is coupled to signal processing and display equipment, described infra, in a range control tower 46. Control tower 46 is positioned on a cease-fire/fowl line 48 approximately 2,000 feet from the plane of targets 1, 2, 3 and 4.

A down range cease-fire sensor 50 is centrally positioned between and approximately 300 feet from the plane of targets 1, 2, 3 and 4 and an up range cease-fire sensor 52 likewise is centrally positioned between and approximately 2,500 feet from the plane of targets 1, 2, 3 and 4. Down range cease-fire sensor 50 is coupled by buried cable 42 to control tower junction box 44 and subsequently to signal processing and display equipment in control tower 46. Up range cease-fire sensor 52 is coupled via a buried cable 54 to control tower junction box 44 and likewise ultimately to signal processing and display equipment in control tower 46.

The strafing range operates as follows. A pilot in an aircraft 56, on approaching the target plane for strafing practice, will be ordered to approach either left range 10 or right range 12. The pilot in aircraft 56 may then approach left range 10 as ordered and fire on either inner target 1 or outer target 3, as he so chooses; however, he must cease-fire before reaching cease-fire fault line 48. Vector sensor pairs $H_1/L_1$ and $H_3/L_3$ utilizing SWA and TOA differentials determine which target was fired on and the specific location in polar coordinates (R&$\phi$) of each round's penetration of a fifty foot radius surrounding the target fired upon. Down range cease-fire sensor 50, determines the total rounds fired by means of examining the shell shock waves in a time domain. Down range cease-fire sensor 50 also determines at what point the pilot stopped firing by utilizing the time differential between TOA of shell shock waves and the aircraft muzzle blast. Up range cease-fire sensor 52 operates as a back up to down range cease-fire sensor 50 when, for example, the aircraft strafes at a greater distance, usually 4,500 feet or more measured from target plane, rather than close in to the target plane where the sensitivity of sensor 52 is more optimal that that of sensor 50.

Figure 2:
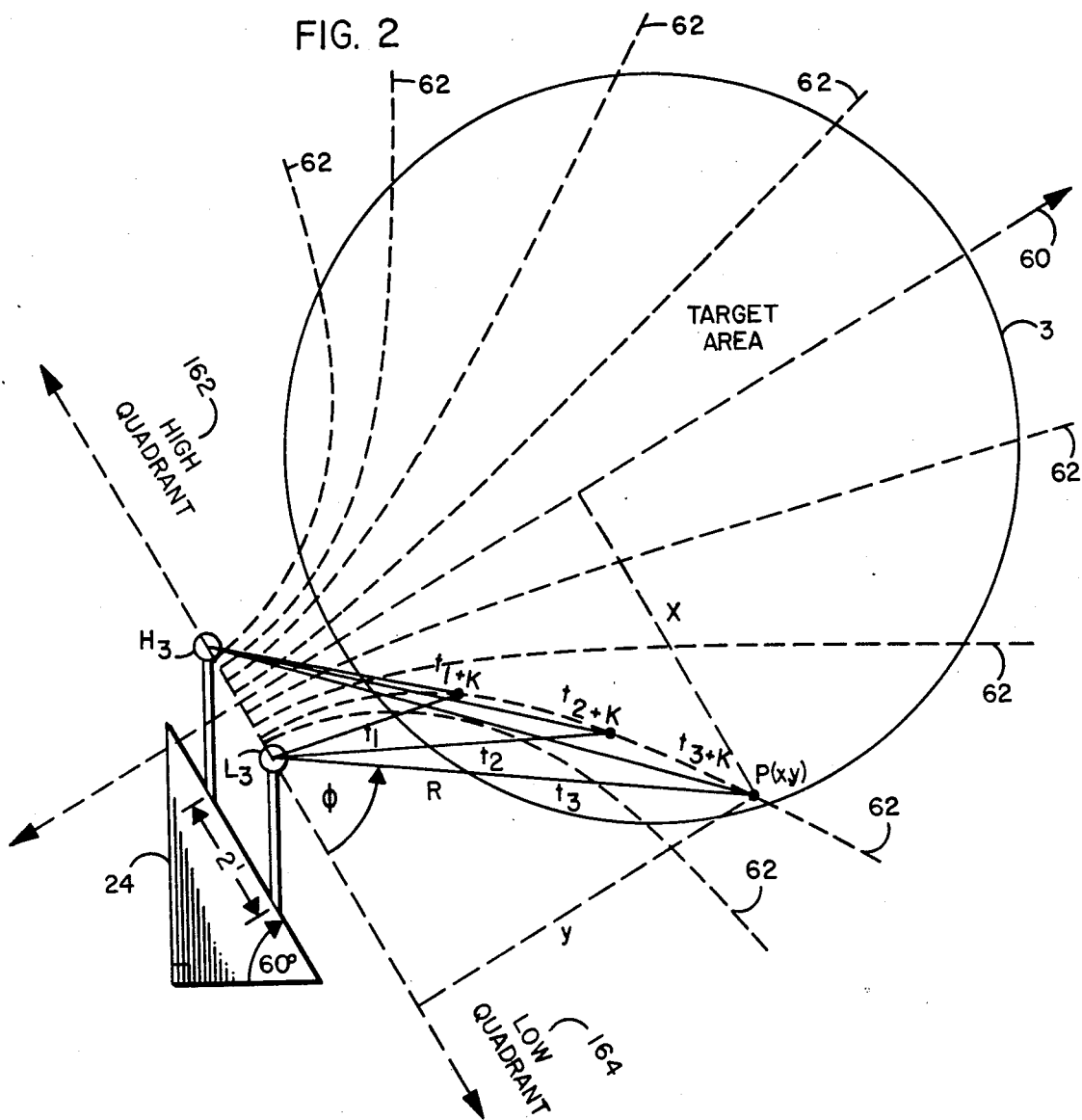
FIG. 2 illustrates the hyperbolic pattern of TOA sound wave time differentials associated with a pair of acoustic vector sensors.

Referring now to FIG. 2, an explanation will be given as to how vector sensor pairs $H_1/L_1$, $H_2/L_2$, $H_3/L_3$ and $H_4/L_4$ function. FIG. 2 illustrates a two dimensional view of a single vector sensor pair $H_3/L_3$ of target 3 in left range 10 but applicable to all other vector sensor pairs. High vector sensor $H_3$ is positioned a precise distance of two feet up a sixty degree incline 24 from low vector sesnor $L_3$. Incline 24 is set at a 13° to 15° angle from a vertical plane to the ground to parallel the plane of the target. When two such sensors are set up to detect a discrete signal, a sound wave or shock wave, and this signal occurs at any point on a line 60 equidistant from vector sensor $H_3$ and $L_3$, the sensors will receive the signals at the same time. If the signal occurs at a point which is not equidistant from vector sensors $H_3$ and $L_3$, there will be a differential (time difference) between the TOA of the two signals. If lines of constant time differential (K) are plotted, respects a given time (t), said lines will form an infinite number of hyperbolic patterns as indicated by lines 62 emanating from a line connecting sensors $H_3$ and $L_3$ and which pass through a fifty foot radius of the target.

Figure 3:
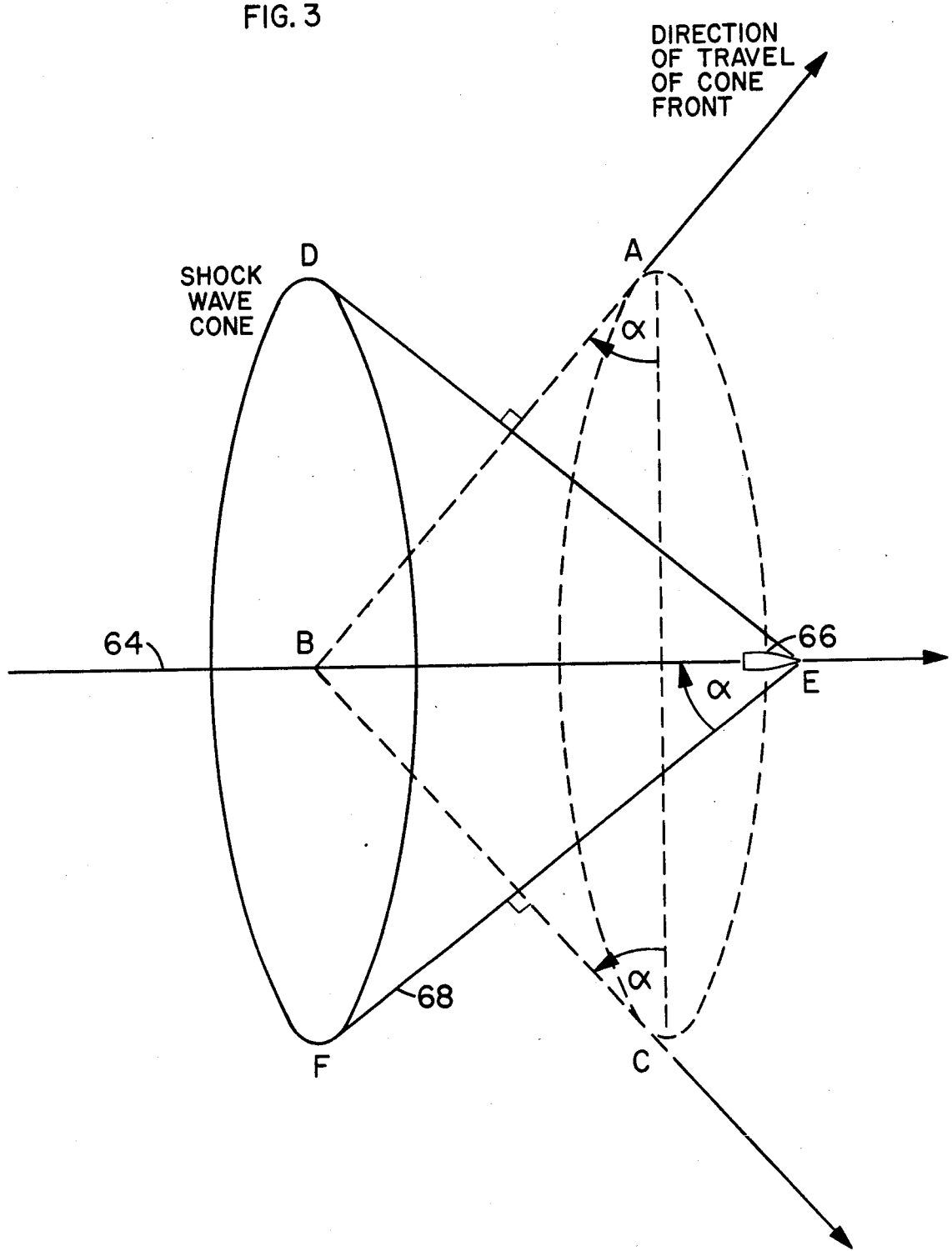
FIG. 3 illustrates the three dimensional cone theory direction of travel of a shock wave toward a pair of vector sensors.

The actual environment, however, is not two dimensional but three dimensional as is illustrated in FIG. 3.

FIG. 3 illustrates a three-dimensional view of a trajectory 64 of a shell (bullet or round) 66 path which is essentially perpendicular to the target area of FIG. 2. FIG. 3 illustrates a "Hseih Cane Theory" that dictates that a shock wave 68 from bullet 66 does not propagate on a plane perpendicular to trajectory 64. Instead, shock wave 68 in a three dimensional sense propagates with the speed of sound along a cone surface characterized with tip angle ABC, which is perpendicular to a Mach cone surface characterized with tip angle DEF. Mach cone angle DEF typically lies along shell trajectory 64 and is characterized by a Mach Angle ($\alpha$) and Mach Number (M), where:

$$\alpha = \sin^{-1}\frac{1}{M}, \text{ and} \qquad (1)$$

$$M = \frac{\text{velocity of bullet}}{\text{velocity of sound}} \qquad (2)$$

In short without considering the Hsieh Cone Theory, the shell would appear to penetrate the target plane at a point in front of the target rather than at a point on the target as desired.

Therefore, a formula was developed to reduce the actual three dimensional orientation of FIG. 3 to a two dimensional orientation of FIG. 2 to give a true indication of exactly where the shell penetrated the target plane.

Referring again to FIG. 2, orthoginal coordinates in the plane of vector sensor pair $H_3$ and $L_3$ of a point $P(x, y)$ where a shell penetrated the target plane is given by:

$$x = \frac{\Delta t + 2R\Delta t}{4} \qquad (3)$$

$$y = \left[R^2 - \left(\frac{\Delta t + 2R t}{4} - 1\right)^2\right]^{\frac{1}{2}} \qquad (4)$$

where $\Delta t$ is the difference in TOA of a shock wave arriving at vector sensor $H_3$ and subsequently arriving at vector sensor $L_3$.

FIG. 2 illustrates that R is the distance from vector sensor $L_3$ to the impact point $(P(x, y))$ in the target plane and is determined from the amplitude (A) of the shock wave given by:

$$A = \frac{Ce^{-10-11f^2R}}{R^{\frac{1}{2}}} \qquad (5)$$

alternatively described as:

$$10^{11} \log_e\left(\frac{C}{AR^{\frac{1}{2}}}\right) = Rf^2$$

Where:
A is the shock wave amplitude sensed by vector sensor $L_3$;
f is the frequency of the shock wave which is a function of the weapon type, usually ranging from 10 KHz to 30 KHz; and
C is a constant, which is a function of the sensitivity of the sensors used.

The amplitude equation (5) when plotted will yield a graph, where a given amplitude (A) in millivolts (mv) on the ordinate axis will yield a respective distance (R) in feet on the absissa. Polar coordinate radius R and angle $\phi$ may be conveniently and conventionally obtained from rectangular coordinates x and y of equations 3 and 4.

Figure 4:
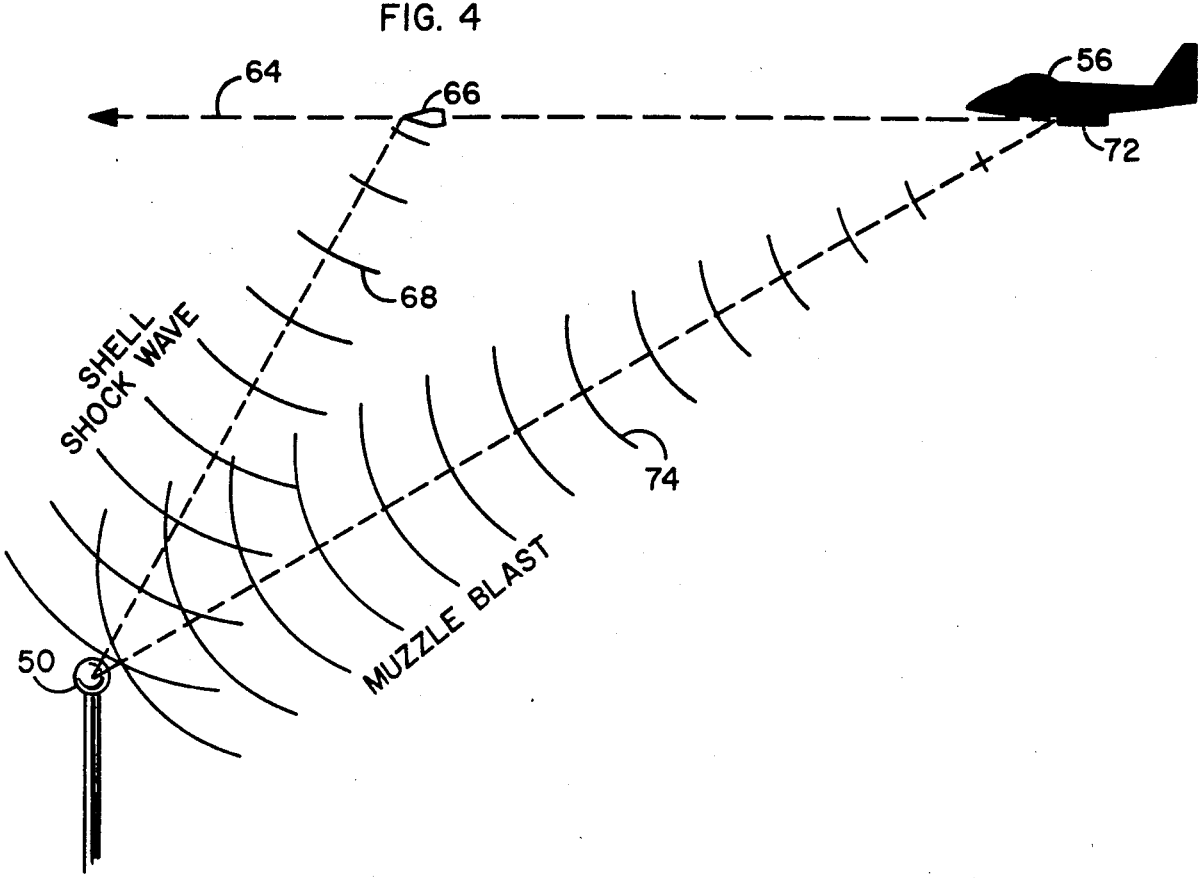
FIG. 4 illustrates a cease-fire sensor reception of TOA difference of a shell shock wave and its respective muzzle blast.

Referring now to FIG. 4, a description of the theory and operation of cease-fire (C/F) sensors 50 and 52 will be given. Cease-fire sensors 50 and 52 both function independently and in the same manner. Down range cease-fire sensor 50 illustrated in FIG. 4, operates when the strafing begins and/or ends close to cease-fire/fault line 48. Correspondingly, uprange cease-fire sensor 52 operates when strafing begins and/or ends at a greater distance from cease-fire line 48 where sensitivity of C/F sensor 50 is not optimal. As can be seen from FIG. 4, a typical strafing aircraft 56, having a velocity of approximately 500 feet/second, fires a strafe round. A typical strafing shell 66 travels at around 3,000 feet/second and emits a shock wave 68 traveling at the speed of sound, approximately 1,000 feet/second toward cease-fire sensor 50. Shell 66 is fired from a gun 72 on aircraft 56. Gun 72 emits a muzzle blast 74 which of course also travels at the speed of sound toward cease-fire sensor 50.

The difference in TOA of shell shock wave 68 and respective muzzle blast sound wave 74 can then be used together with a tabulated knowledge of ballistic characteristics and velocity decrease of the particular caliber of projectile to determine via extrapolation exactly what distance aircraft 56 was from C/F sensor 50 and/or the target plane upon firing its last projectile (bullet). By such means, it can be determined whether the pilot ceased firing before reaching fault line 48 of FIG. 1.

Figure 5:
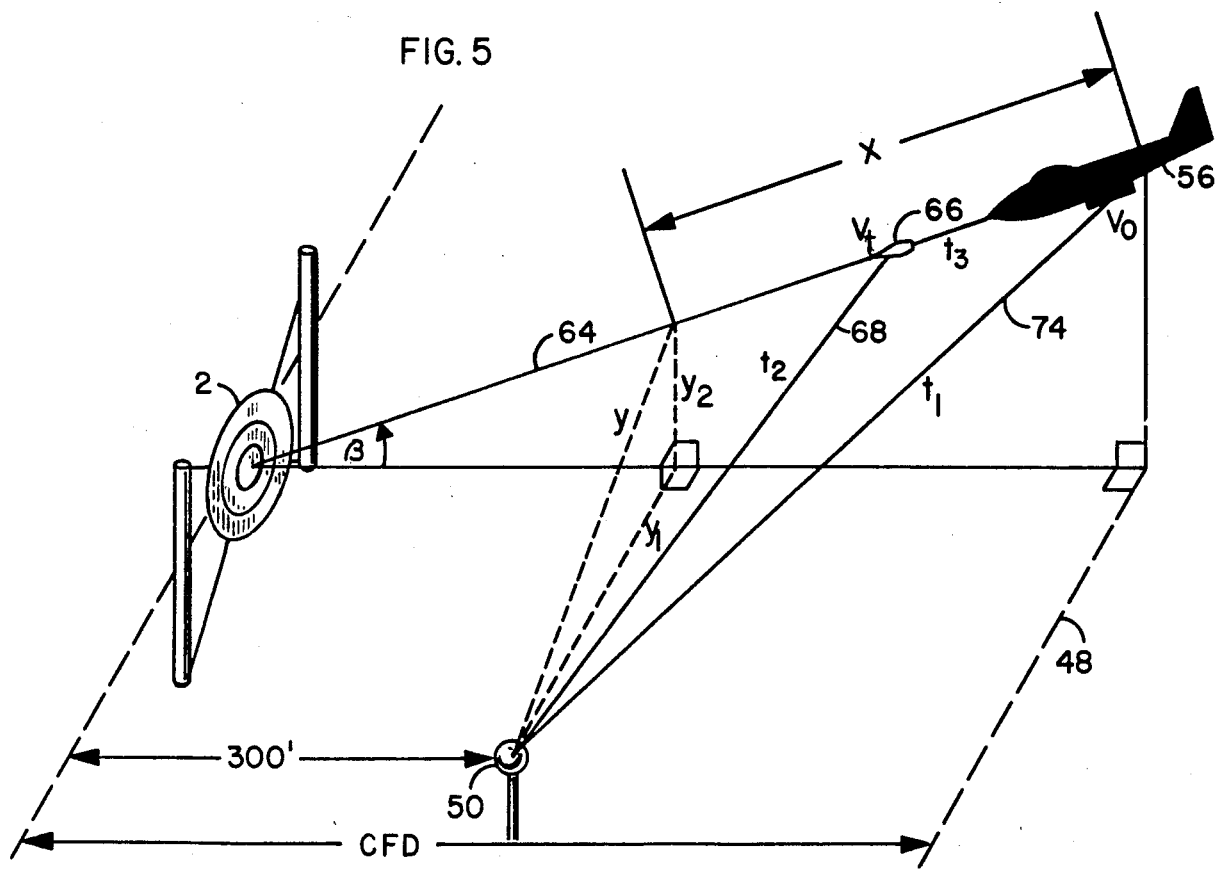
FIG. 5 illustrates the three dimensional geometry utilized in calculating a cease-fire distance.

FIG. 4 is a two dimensional perspective of the theoretical approach for purposes of illustration. FIG. 5, however, depicts the actual, three dimensional orientation of FIG. 4. Aircraft 56 and bullet 66 trajectory 64 approach target 2, for example, at a vertical angle $\beta$; however, due to the orientation of cease-fire sensor 50 centrally positioned between both left range 10 and right range 12, a three dimensional orientation must be considered. In FIG. 5, the time difference between initial bullet 66 velocity ($V_0$) upon leaving aircraft 56 and sometime later ($V_t$) is represented as $t_3$. Similarly if the time for bullet 66 shock wave 68 to reach cease-fire sensor 50 is $t_2$, and the time for muzzle blast sound wave 74 leaving aircraft 56 to reach cease-fire sensor 50 is $t_1$, then the TOA time differential ($t_D$) between bullet shock wave 68 and muzzle blast sound wave 74, will be:

$$t_D = t_1 - (t_2 + t_3) \qquad (6)$$

Referring again to FIG. 5, cease fire sensor 50 is super imposed on the plane of aircraft 56 and shell/strafing trajectory 64. Distance of cease-fire sensor 50 from the target plane is defined (300 feet) and diving angle $\beta$ is known. Therefore, cease-fire distance (CFD) is described by:

$$CFD = 300 + x \cos \beta \qquad (7)$$

To determine x, a formula was derived as follows:

$$aZ^3 + bZ^2 + cZ + d = 0 \qquad (8)$$

Where coefficients of this third degree equation are:

$$a = 1 \qquad (9)$$

$$b = 2(2wx - V_o^2) - V_s^2 \quad (10)$$

$$c = 2(2wx - V_o^2)^2 - 2(2wx - V_o^2)V_s^2 \quad (11)$$

and $$d = -[(2wx - V_o^2)^2 + 4w^2 y^2]V_s^2 \quad (12)$$

Where:

w is the deceleration of the bullet calculated from a conventional ballistic table of shell velocity (ft/sec) vs distance (ft);

$V_o$ is the initial velocity of the bullet (i.e. fired velocity plus the velocity of the aircraft);

$V_t$ is velocity of the bullet at that point in time for the respective shock wave to reach cease-fire sensor 50; and $$Z = V_t^{\frac{1}{2}} \quad (13)$$

By observation, it can be seen that:
$$Y = (Y_1^2 + Y_2^2)^{\frac{1}{2}} \quad (14)$$

where $$Y_1 = 500, \text{ and} \quad ((15)$$

$$Y_2 = 300 \tan \beta \quad (16)$$

then:

$$t_D = \frac{(x^2 + y^2)^{\frac{1}{2}}}{v_s} - t' - \frac{y}{v_s(1 - v_s^2/v_1^2)} \quad (17)$$

Where $t_D$ is the time window measured from the end of the shock wave to the end of the muzzle blast, $V_s$ is the velocity of sound, and $$t' = \frac{V_0 - V_1}{W} \quad (18)$$

Combining equations 8, 17 and 18 will permit a solution for x, from which the cease-fire distance (CFD) may accurately be determined.

Figure 6:
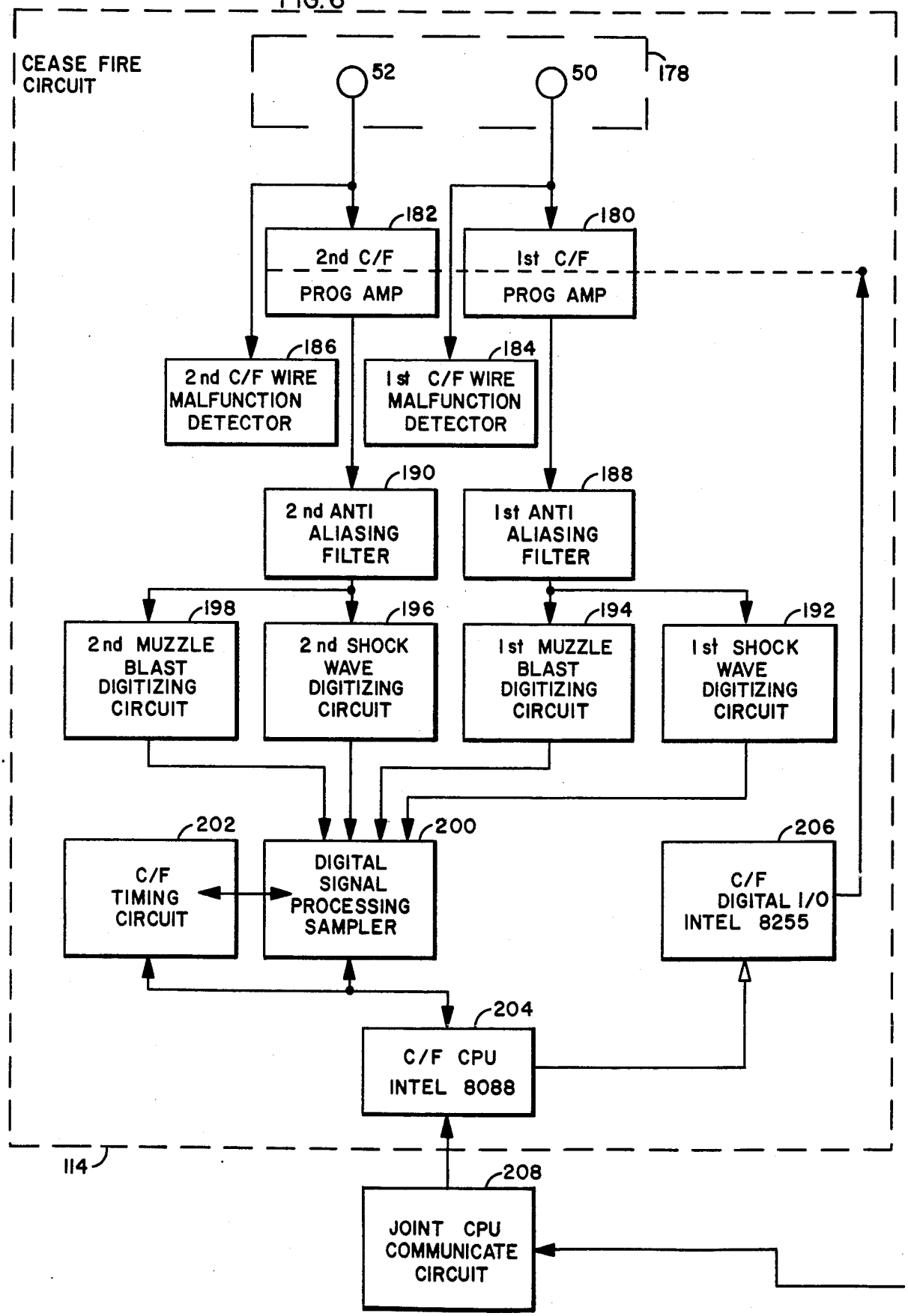
FIG. 6 illustrates a block diagram of the vector and the cease-fire signal processing circuit.
Figure 6:
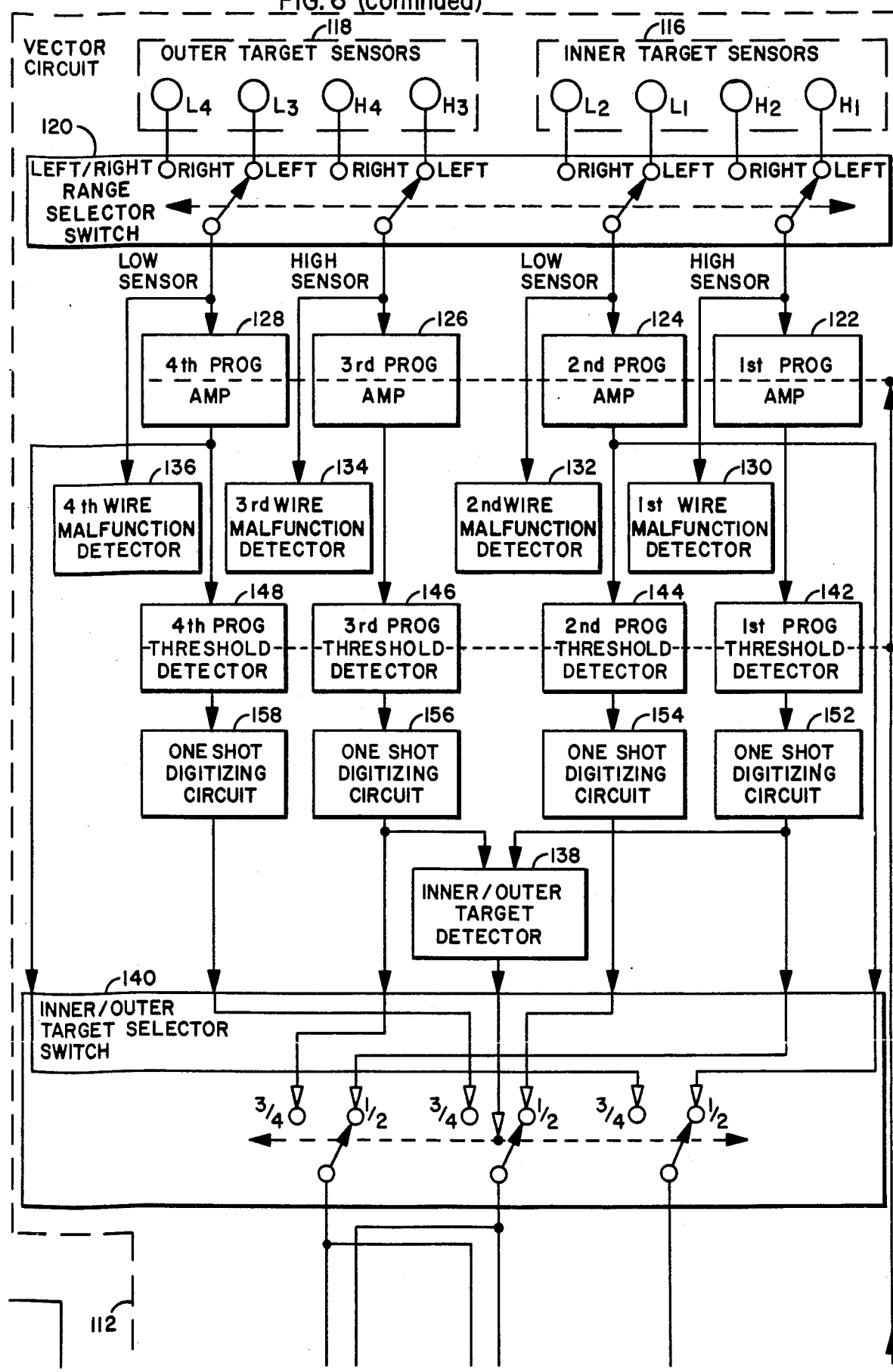
Figure 6:
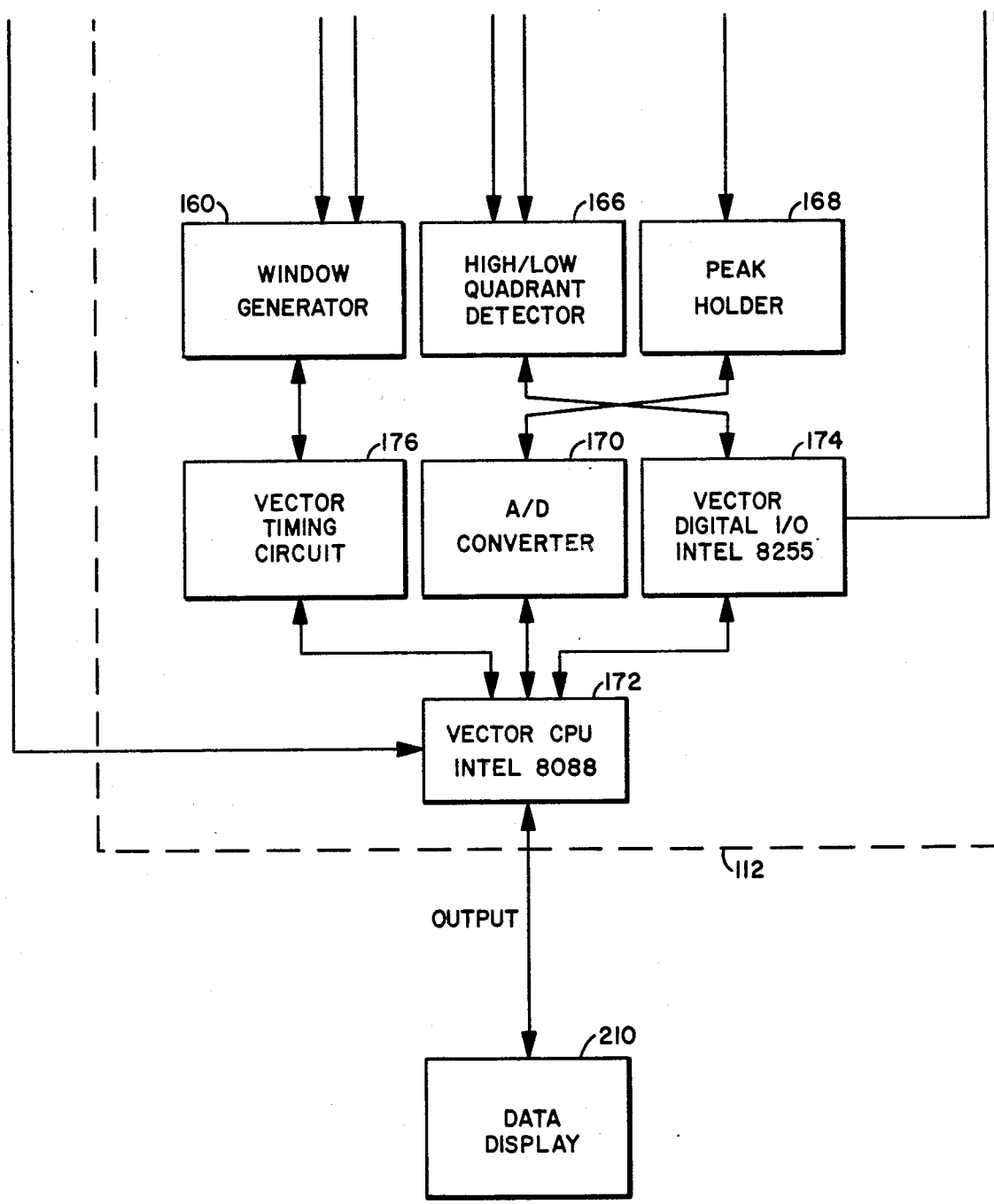

Referring now to FIG. 6, a block diagram is illustrated of the remote data processing and display equipment located in control tower 46 of FIG. 1, which, among other things, makes the foregoing calculations. In FIG. 6, a vector processing circuit is enclosed by dashed box 112 and a cease-fire processing circuit is enclosed by dashed box 114. Inner targets, 1 and 2 of FIG. 1, having high/low vector sensor pairs $H_1/L_1$ and $H_2/L_2$, respectively, are represented in dashed box 116. Outer targets, 3 and 4, having high/low vector sensor pairs $H_3/L_3$ and $H_4/L_4$, respectively, are represented by dashed box 118. A manual four pole, double throw switch 120 located in control tower 46 allows personnel in the tower to select activation of vector sensor pairs in either left range 10 (left), or right range 12 (right), as indicated in FIG. 6.

Assuming that a left range 10 approach is chosen by personnel in control tower 46, an approaching aircraft 56 may fire/strafe on either target 1 or 3 in left range 10; i.e., he may not approach targets 2 or 4 in right range 12. When left range 10 is selected for strafing target 1 vector sensors $H_1/H_1$ and target 3 vector sensors $H_3/L_3$ are activated as illustrated in FIG. 6 by manually operated left/right range selector switch 120 in control tower 46. A shock wave from a shell (bullet or round) fired toward either target 1 or target 3 will be sensed by both vector sensor pairs $H_1/L_1$ and $H_3/L_3$, causing a pulse to pass to a first, second, third and fourth programmable amplifiers 122, 124, 126 and 128, respectively. A first, second, third and fourth wire malfunction detectors 130, 132, 134 and 136 coupled to vector sensors $H_1$, $L_1$, $H_3$ and $L_3$, have circuits which indicate a break in or lack of continuity in buried cables 28 for $H_1/L_1$ and 34 for $H_3/L_3$, as well as a malfunction in vector sensors $H_1$, $L_1$, $H_3$ and $L_3$.

Programmable amplifiers 122, 124, 126 and 128 are programmed to amplify or adjust the dynamic range of vector sensor pulses in consideration of the caliber of shell used such that the pulse amplification is still in the linear range of the amplifier to prevent either saturation or cut off.

A first, second, third and fourth programmable threshold detectors 142, 144, 146 and 148 are coupled to programmable amplifiers 122, 124, 126 and 128, respectively. Programmable threshold detectors 142, 144, 146 and 148 set a threshold level such that for any caliber of shell fired, a penetration of a target area greater than fifty feet radius from a target center will not be scored/displayed; threshold detectors also prevent echoes, other target shooting and stray noises from accidentally indicating/registering a hit.

A first, second, third and fourth one-shot digitizing circuits 152, 154, 156 and 158 are coupled to programmable threshold detectors 142, 144, 146 and 148, respectively. One shot digitizing circuits 152, 154, 156 and 158 determine from the varying analog signal input, at which moment the shock wave can ve considered as arriving at the respective sensor. At a specified input signal voltage level, the analog signal/pulse is converted to a digital pulse, i.e., TTL 0–5 volts, such that a computer downstream will be able to start counting from when first one shot 152 registers a pulse (opens a window) to when second one shot 154 registers a pulse (closes a window). For example, if target 1 is being fired upon, a window generator 160, coupled through an inner/outer target selector switch 140 to first and second one-shot digitizing circuits 152 and 154, will develop a digital window of time lapse between a signal hitting high vector sensor $H_1$ and low vector sensor $L_1$.

An inner/outer target detector 138 is coupled to high vector sensor ($H_1$) of target 1 and to high vector sensor ($H_3$) of target 3 via first and third one-shot digitizing circuits 152 and 156. By time comparison of signals received, target detector 138 can determine which target (sensors) received a shock wave earlier than the other and therefore determine whether target 1 or target 3 was fired upon, i.e., the target (sensor) first receiving the shock wave is presumed to be the target fired upon because that is the target which the rounds would be closest. Inner/outer target detector 138 upon receiving an earlier signal from target 1 high vector sensor $H_1$ causes an inner/outer selector switch 140 to switch a triple pole double throw switch to targets 1 and 2 only ($\frac{1}{2}$) and cutting off targets 3 and 4 ($\frac{3}{4}$) as indicated in FIG. 6. Selector switch 140 selects between targets 1 and 3 or 2 and 4 as indicated; n.b., manual swtch 120 has already eliminated targets 2 and 4 in right range 12 leaving the selecting between only 1 or 3. Therefore, left range inner target 1 is chosen by target detector switch 140 as indicated in FIG. 6.

Referring again to FIG. 2, a time window obtained by window generator 160, will determine a specific hyperbolic curve 62; however, the computer will not know whether the hyperbolic curve is in a high quadrant 162 or a low quardrant 164 of FIG. 2. Therefore, a high/low quadrant detector circuit 166, coupled through target selector switch 140 to first and second digitizing circuits 152 and 154, determines by appropriate hardware circuitry which quadrant the signal came from by considering which sensor of a sensor pair, e.g., $H_1/L_1$ of target 1, received the signal first. If the higher sensor $H_1$ received the signal first, quadrant detector 166 will choose high quadrant 162. If the lower sensor $L_1$ received the signal first, quadrant detector 166 will choose low quadrant 164.

A peak holder 168, coupled through target selector switch 140 and second programmable amplifier 124 to low vector sensors $L_1$ or $L_2$, or coupled to fourth programmable amplifier 128 to low vector sensors $L_3$ or $L_4$, obtains and holds the analog peak of a pulse to determine a shock wave amplitude and thereby determine the distance R (FIG. 2) on particular time referenced hyperbola 62 that a shell penetrated the traget or the fifty foot radius surrounding the target. Peak holder 168 is then coupled via an analog to digital (A/D) convertor 170 to a vector central processing unit (CPU) 172. High/low quadrant detector 166 is likewise coupled via a digital input/output (I/O) circuit 174 to vector CPU 172 and window generator 160 is coupled through a vector timing circuit 176 to vector CPU 172.

Vector CPU 172 in turn is coupled via digital I/O 174 to programmable threshold detectors 142, 144, 146 and 148 to programmable amplifiers 122, 124, 126 and 128 to regulate the analog signal amplitude as desired and programmed into vector CPU 172.

The cease-fire (C/F) signal processing circuit is enclosed by dashed box 114. Up range C/F sensor 50 and down range sensor 52 are enclosed by dashed box 178. Cease-fire signal processing circuit 114 reacts in response to vector signal processing circuit 112. When C/F sensors, 50 or 52, receive a bullet shock wave, vector signal processing circuit 112 is so notified. When vector signal processing circuit 114 determines what range (left or right), what target (inner or outer) it so notifies C/F circuit 114 for further signal processing because time lapse and distance between inner and outer targets requires different calculations. Once C/F distance is calculated by C/F circuit 114, vector circuit 112 is so notified.

Up range C/F sensor 50 and down range C/F sensor 52 are coupled to a fifth and sixth programmable amplifiers 180 and 182, respectively. Again because different calibers of shells create different shock wave strengths/intensities, i.e., too strong a signal/shock wave will saturate the amplifiers, yielding a flat output, and indicating little if any difference in one analog pulse to another a variable amplifier is needed. Correspondingly, a weak signal would be lost in noise or would admit noise, again yielding little if any information on analog pulses. Although one C/F sensor is sufficient to determine the C/F distance, use of two is preferred as described above.

Prior art required use of two C/F sensors. By detecting time lapse of a shock wave reaching each sensor at a known distance and knowing the velocity decrease of a given caliber shell in air, the C/F distance was determined.

Again use of two C/F sensors in the invention disclosed herein is preferred but not necessary. A single C/F sensor detects the time lapse between a shell shock wave and a respective muzzle blast on the aircraft to determine at what point the aircraft ceased firing. However, on long strafing approaches, i.e., greater than 4,000 feet, a sensor far from the target plane, at around 2,500 feet, is deemed preferable for better reception of shell shock waves and muzzle blasts. Short strafing approaches, from 2,000 to 4,000 feet, require a sensor positioned at around 300 feet from the target plane.

Prior to aircraft arrival at the range, personnel in the control tower input the caliber of weapon to be fired, the wind speed, etc. into vector and C/F CPU's 172 and 204, respectively which set vector programmable amplifiers (122, 124, 126 and 128), vector programmable threshold detectors (142, 144, 146 and 148), cease-fire programmable amplifiers (180, 182) by vector CPU 172, and by cease-fire CPU 204 via joint CPU communication circuit (208). Vector circuit 112, upon determining the caliber of shell being fired, advises cease-fire circuit 114 which sets first and second C/F programmable amplifiers 180 and 182 to a specific level as was described for first, second, third and fourth programmable amplifiers of vector circuit 112.

A fifth and sixth C/F wire malfunction detectors 184 and 186 are also coupled to C/F sensors 50 and 52, respectively, to indicate a break or discontinuity in buried cables 42 and 54, or a malfunction in C/F sensors 50 and 52, respectively. Vector sensors and C/F sensors, as well as buried cables connected thereto, are vulnerable to hits by stray shells. Therefore, it is necessary that damage to any sensor or cable be immediately known.

Malfunction detectors function by continuously sending out and receiving a direct current (D.C.). Any change in the anticipated D.C. will indicate cable and/or sensor damage.

Signals received by C/F sensors must first be analyzed to differentiate a shock wave from a muzzle blast. A first and second anti-aliasing filters 188 and 190 are coupled to first and second C/F programmable amplifiers 180 and 182, respectively, to prevent the introduction of error into the signal processing of a discrete sampling of continuous (analog) data from C/F sensors 50 and 52, when components with frequencies too great to be analyzed with the sampling interval being used contribute to amplitudes of lower frequency components.

By enveloping the successive shell shock wave signals and successive muzzle blast sound wave signals, extraneous/unimportant information is eliminated, thereby obtaining a simplified and informative signal. The very high frequency of a shock wave (30–40 KHz) received is, by enveloping, reduced to a much lower frequency (<1 KHz). Anti-aliasing filters 188 and 190 filter out the high frequency components and thereby eliminate introduction of error into the circuit.

Cease-fire signals then pass from first anti-aliasing filter 188 to a first shock wave digitizing circuit 192 and a first muzzle blast digitizing circuit 194. Likewise, second anti-aliasing filter 190 is coupled to a second shock wave digitizing circuit 196 and a second muzzle blast digitizing circuit 198. Digitizing circuits, 192, 194, 196 and 198 differentiate shell shock waves from muzzle blast and convert the analog signals respectively to digital format for input of all signals into a digital signal processing sampler 200. Digital signal processing sampler 200 is coupled to and controlled by a C/F timing circuit 202 and a C/F CPU 204. Cease-fire CPU 204 in communication with vector CPU 172 via a joint CPU communication circuit 208, yields a data display output 210 on a CRT or printer in tower 46 along with other input flight strafing data or can be sent by modem to a remote location for storage and later use. Likewise, the results from vector CPU 172 yield data displays on liquid crystal displays (LCD).

Figure 7:
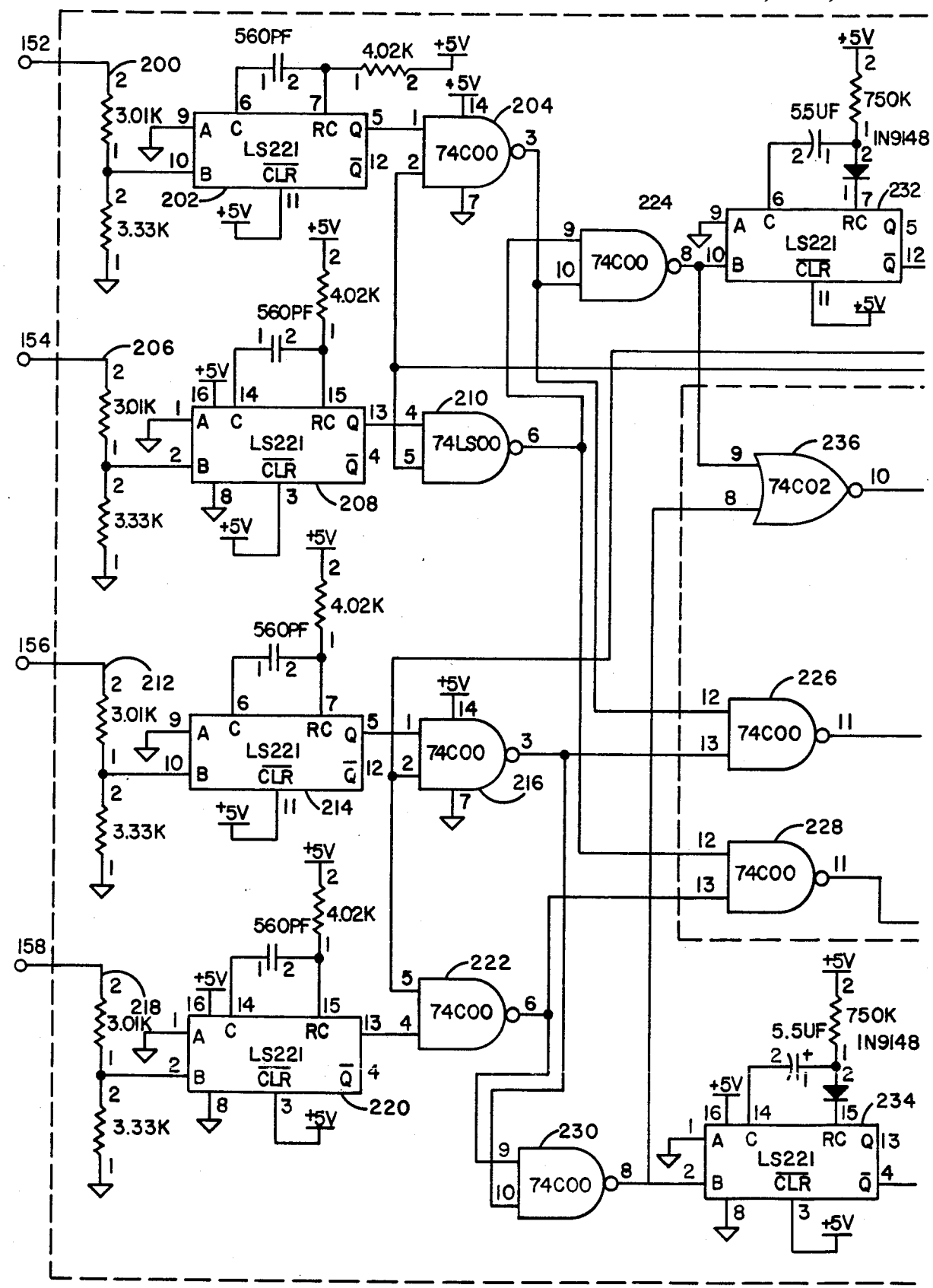
FIG. 7 illustrates a schematic delinating the circuit required to differentiate an inner vs. outer target approach, a high vs. low quadrant hit and a TOA window generator.
Figure 7:
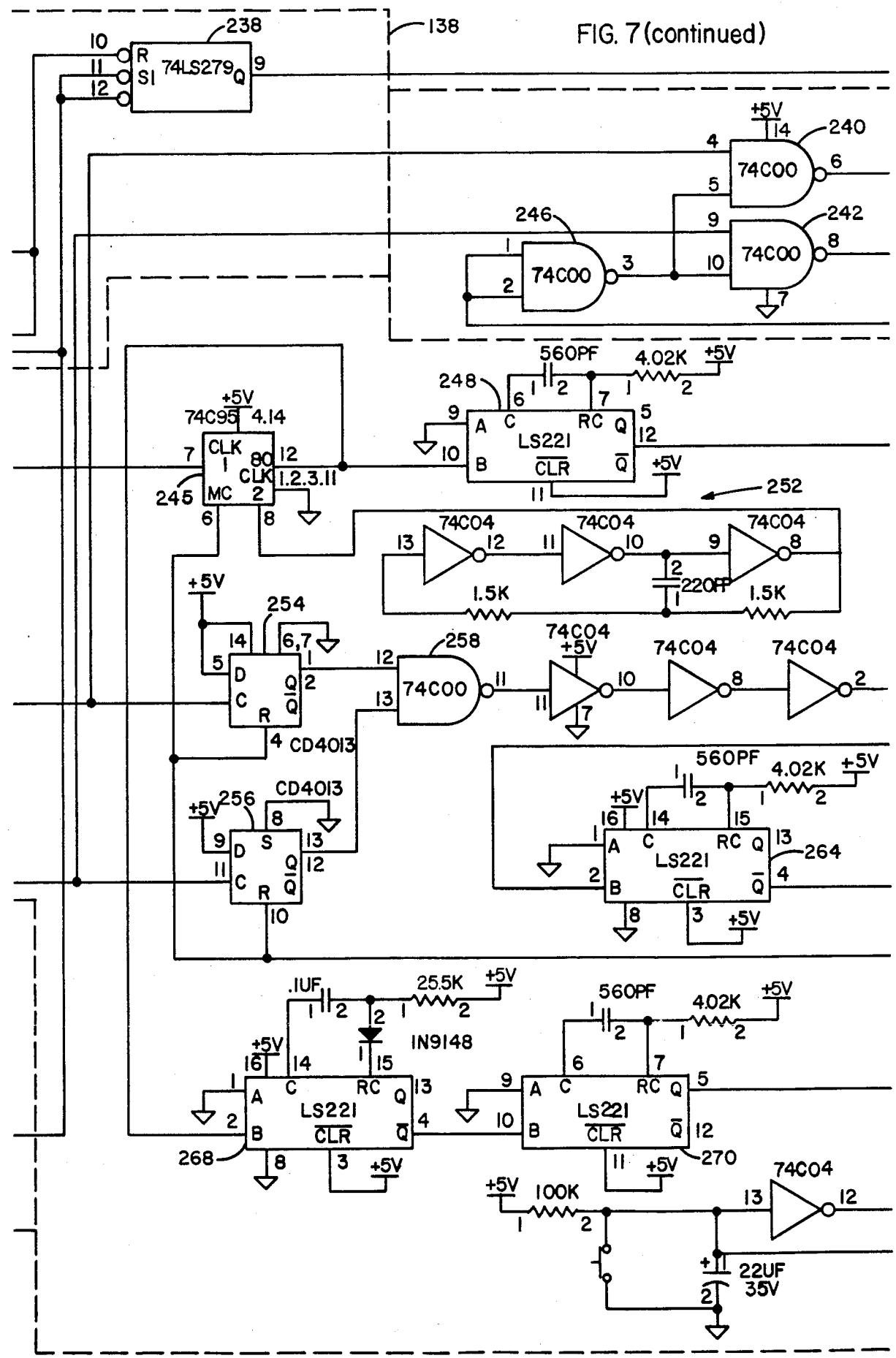
Figure 7:
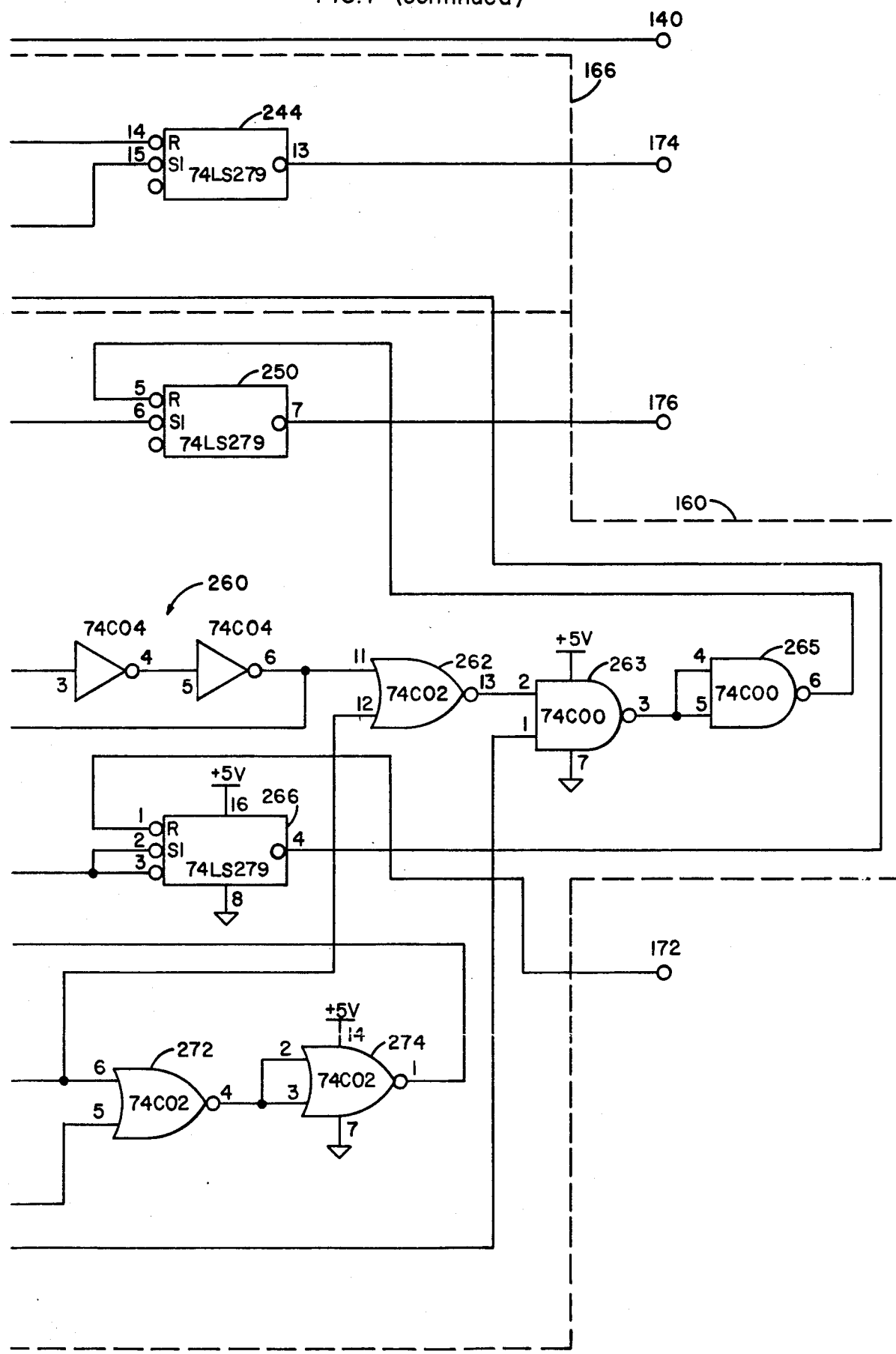

The functional block diagram of FIG. 6 is considered self explanatory to one experienced in the art with the exception of inner/outer target detector 138, high/low quadrant detector 166, and window generator 160, which circuits due to the unobvious implementation are disclosed herein. Referring therefor to FIG. 7, a detailed component schematic is provided for blocks 138, 160 and 166 of FIG. 6. FIG. 7 illustrates a dashed box 138 which encloses the necessary circuit for inner/outer target detector 138. Dashed box 166 encloses the circuit for high/low quadrant detector 166 and dashed box 160 encompasses the circuit for window generator 160. Output of one-shot digitizing circuits, 152, 154, 156 and 158 of FIG. 6, are indicated as input terminals 152, 154, 156 and 158 to dashed box 138/140 of FIG. 7.

Referring to dashed box 138 of FIG. 7 and assuming an initial strafing occurs in left range 10 on inner target 1 and in high quadrant 162 of vector sensor pair $H_1/L_1$ of target 1, then the shock wave from the first bullet in the strafing period will be received by sensors $H_1/L_1$ and $H_3/L_3$, and will be detected by inner/outer target detector 138 causing inner/outer target selector switch 140 to switch to sensors $H_1/L_1$, of target 1 and register a hit in high quadrant 162.

In FIG. 7, input 152 from first one-shot digitizing circuit 152 of FIG. 6 passes a shock wave pulse from $H_1$ to FIG. 1 through a first voltage divider 200 into a first one-shot 202 and first NAND gate 204. Input 154 from second one-shot digitizing circuit 154 of FIG. 6 passes the same shock wave pulse from $L_1$ of FIG. 1 a very brief moment later through a second voltage divider 206 to a second one-shot 208 and second NAND gate 210. A short time later the same shock wave will hit $H_3$ and $L_3$ and will enter inputs 156 and 158 leading to third and fourth voltage dividers 212 and 218 to third and fourth one-shots 214 and 220 and to a third and fourth NAND gates 216 and 222, respectively.

NAND gate 204 ($\overline{x \cdot y} = \overline{x} + \overline{y}$) inputs into a fifth and sixth NAND gates 224 and 226. Gate 210 inputs into gate 224 and a seventh NAND gate 228. Gate 216 inputs into gate 226 and an eighth NAND gate 230. Gates 224 and 230 input to a fifth and sixth one-shots 232 and 234, respectively, and to a first NOR gate 236 ($\overline{x + y} = \overline{x} \cdot \overline{y}$).

By observation, it can be seen that if inputs 152 and 154 go high before inputs 156 and 158, i.e. by a shock wave pulse, then gates 204 and 10 turn on and one-shot 232 will disable gates 216 and 222 and reset a flip-flop 238. Correspondingly, when the shock wave is received by inputs 156 and 158 before inputs 152 and 154, then gates 216 and 222 turn on and one-shot 234 will disable gates 204 and 210 and reset flip-flop 238. Since gates 20 and 210 represent inner target sensors $H_1$ and $L_1$, and gates 216 and 222 represent outer target sensors $H_3$ and $L_3$, it can be seen that an inner or outer target selection can be made by flip-flop 238 on the basis of whether sensors $H_1/L_1$ received a shock wave before $H_3/L_3$ or vice versa, because the shells are nearer target 1 or nearer target 3.

By such means flip-flop 238 yields an inner or outer target indication at output 140 to cause switch 140 of FIG. 6 to switch from inner targets 1/2 to outer targets 3/4 and vice versa.

Likewise, and in a similar manner, a ninth and tenth NAND gates 240 and 242 in quadrant selector box 166, coupled to gates 226 and 228, respectively, and an eleventh NAND gate 246, react by setting and resetting a second flip-flop 244 to determine by TOA differentials whether the shell from which the shock wave came, landed in either high quadrant 162 or low quadrant 164 of the target of FIG. 2.

Box 160 discloses a window generator circuit. NOR gate 236 is coupled through a shift register 245 to a seventh one-shot 248 operative as a wave former to a third flip-flop 250 to yield a window output 176. Three invertors 252, coupled in series to register 245, function as a pattern generator for register 245. A first and second D flip-flops 254 and 256 coupled outputs of gates 226 and 228 respectively to a twelfth NAND gate 258 which passes through five series invertors 260, acting as a delay line, into a second NOR gate 262. The delay line helps to generate a window if a round/shell hits equidistant line 60 of FIG. 2 where the TOA differential is difficult to measure. The delay time inserted by hardware is later compensated by software. NOR gate 262 is coupled through NAND gates 263 and 265 to RS flip flop 250. Series invertor 260 output also passes through an eighth one-shot 264, and a third RS flip-flop 266, which is coupled to NAND gate 246. A ninth and tenth one-shots 268 and 270 coupled through a third and fourth NOR gates 272 and 274 function as a reset circuit with reset terminal 172 on flip-flop 246.

Figure 8:
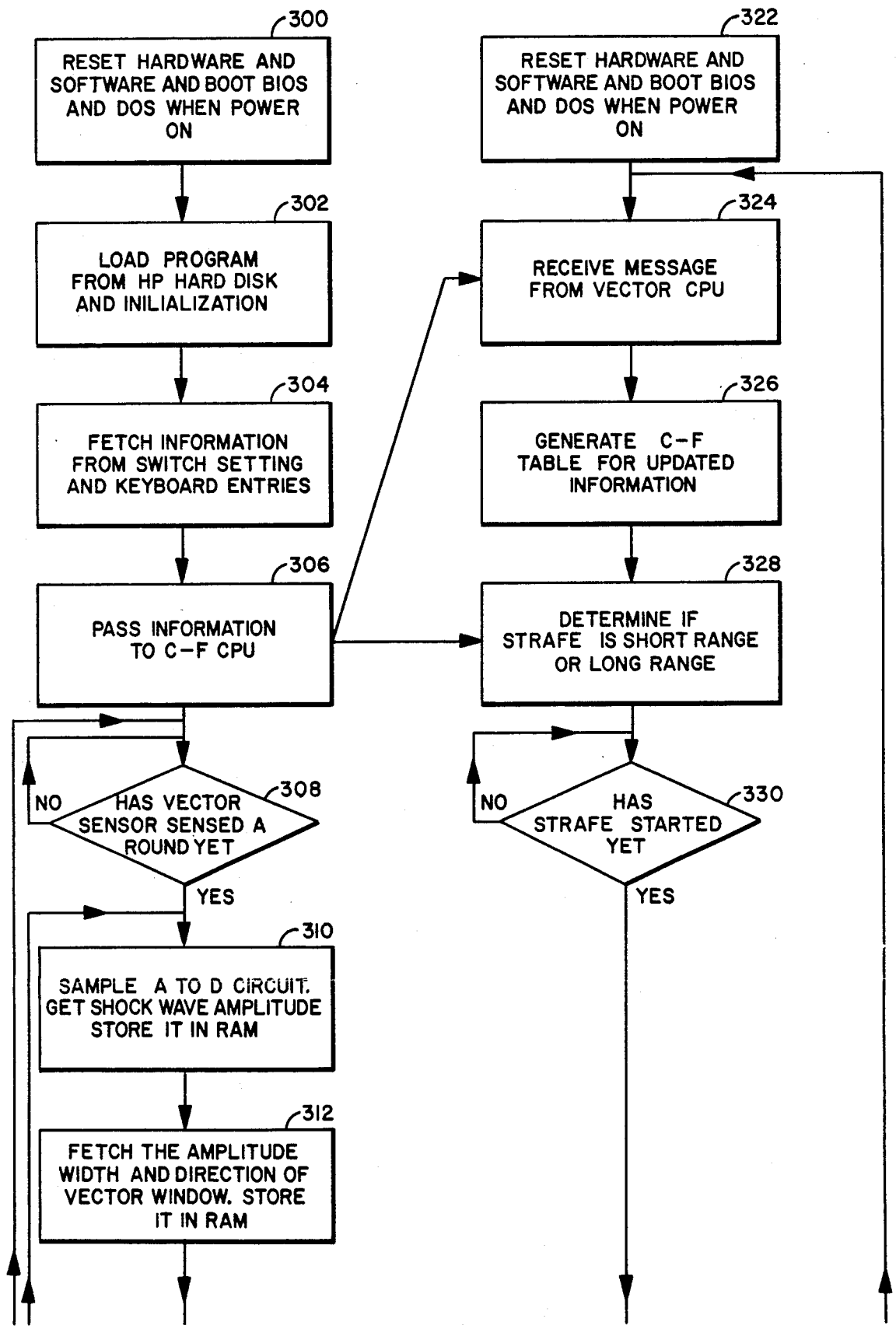
FIG. 8 illustrates a diagram of a flow chart approach to programming the vector CPU and the interrelated cease-fire CPU.
Figure 8:
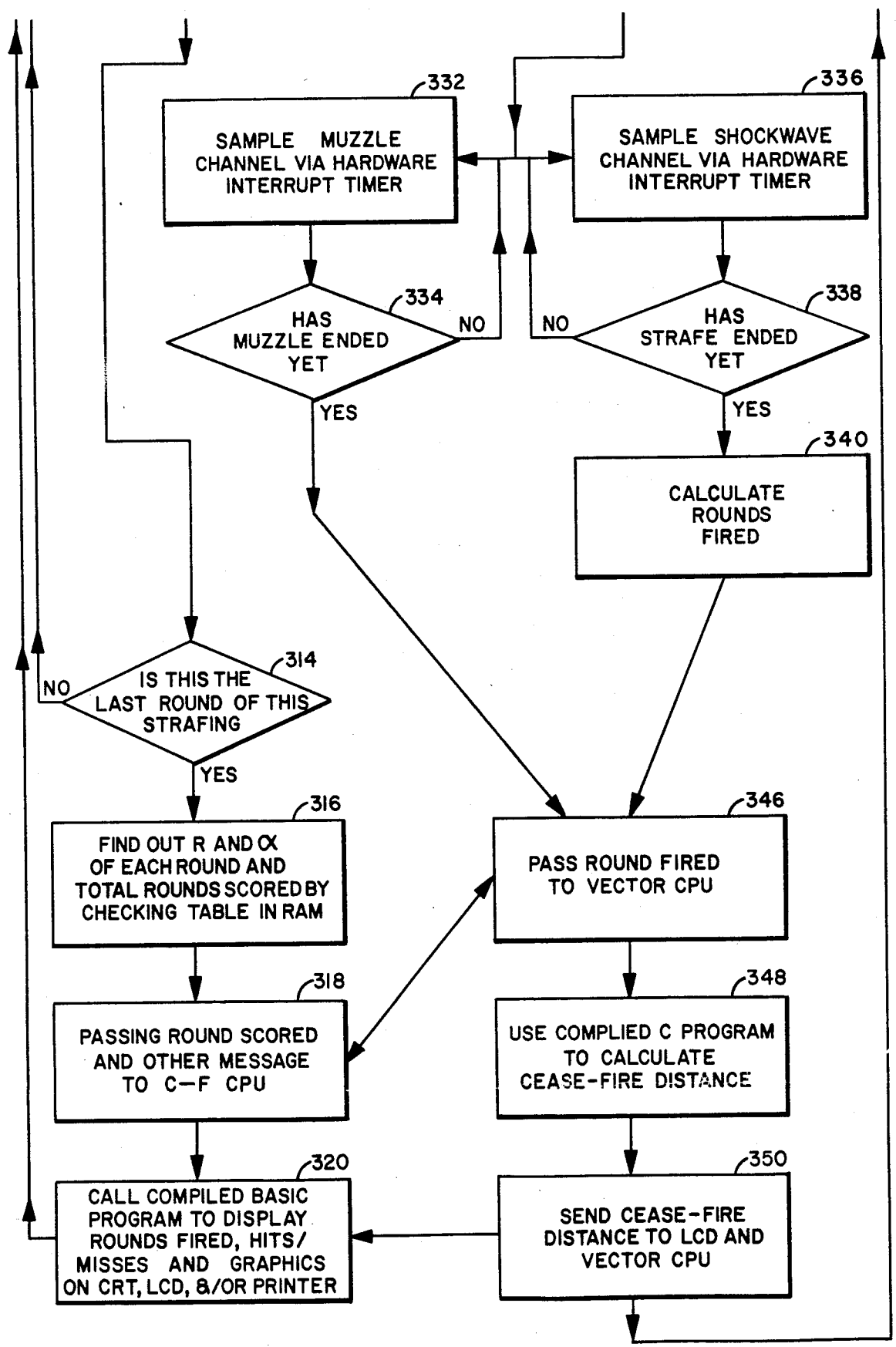

Referring now to FIG. 8, an explanation of the flow chart of computer instructions for vector CPU 172 and C/F CPU 204 will be given. On turning on the system, data processing and display equipment in control tower 46 will be initially powered up. Initial command 300 for vector CPU 172 resets and clears hardware and software and boots/enters an IBM Basic Input/Output System (BIOS) and Data Operating System (DOS) software packages into vector CPU 172. Command 302 enters a computer program designed to process and make amplitude and vector calculation for each round within a fifth foot radius of the target of interest. Command 304 enters information from a keyboard terminal on type aircraft, pilot, caliber of weapon, right or left range selected, short or distant strafing, meteorological and topographical data. Command 306 passes the foregoing information to C/F CPU 204.

Decision box 308 reacts to the shock wave from the first and each succeeding round fired during a strafing approach. Once a vector sensor has sensed a shock wave, its amplitude is measured and stored in Random Access Memory (RAM) by command 310. Command 312 stores the first and each succeeding shock wave amplitude, window width and vector direction. Decision box 314 determines when the last shock wave has passed. Command 316 then enables a subroutine for mathematical calculation to determine the polar coordinates, radius (R) and angle ($\phi$). Command 318 then passes all shock wave data and total rounds scored to C/F CPU 204. Final command 320 then enables a subroutine in BASIC to display hits, misses, ceasefire distance, total rounds fired and other desired aircraft strafing information.

Cease-fire CPU 204 is likewise initiated and functions along with and at the same time as vector CPU 172 by command 322. Command 324 receives keyboard entries from vector CPU 172. Command 326 generates a C/F table respects deceleration and distance of travel of a particular caliber of shell used. Command 328 receives information from vector CPU 172 as to whether a short range or long range strafing approach was used. This information is input by tower personnel for each strafing approach. Decision box 330 determines when a first shock wave and each succeeding shock wave of a series of shells hits C/F sensor 50 or 52. Command 332 samples the muzzle channel (ref. FIG. 6). Decision box 334 determines when the last muzzle blast occurred, i.e., end of strafing. Command 336, likewise samples the shock wave channel (ref. FIG. 6), and decision box 338 determines when the last round, shock wave passes the C/F sensor.

Command 340 calculates the total rounds fired. Command 346 then passes the total rounds fired to vector CPU 172. Command 348 then uses a compiled C program to calculate the cease-fire distance (CFD) for the last round fired and command 350 sends the CFD to vector CPU 172 for display on a CRT, LCD, graph, printout or to a remote area by modem.

Figure 9:
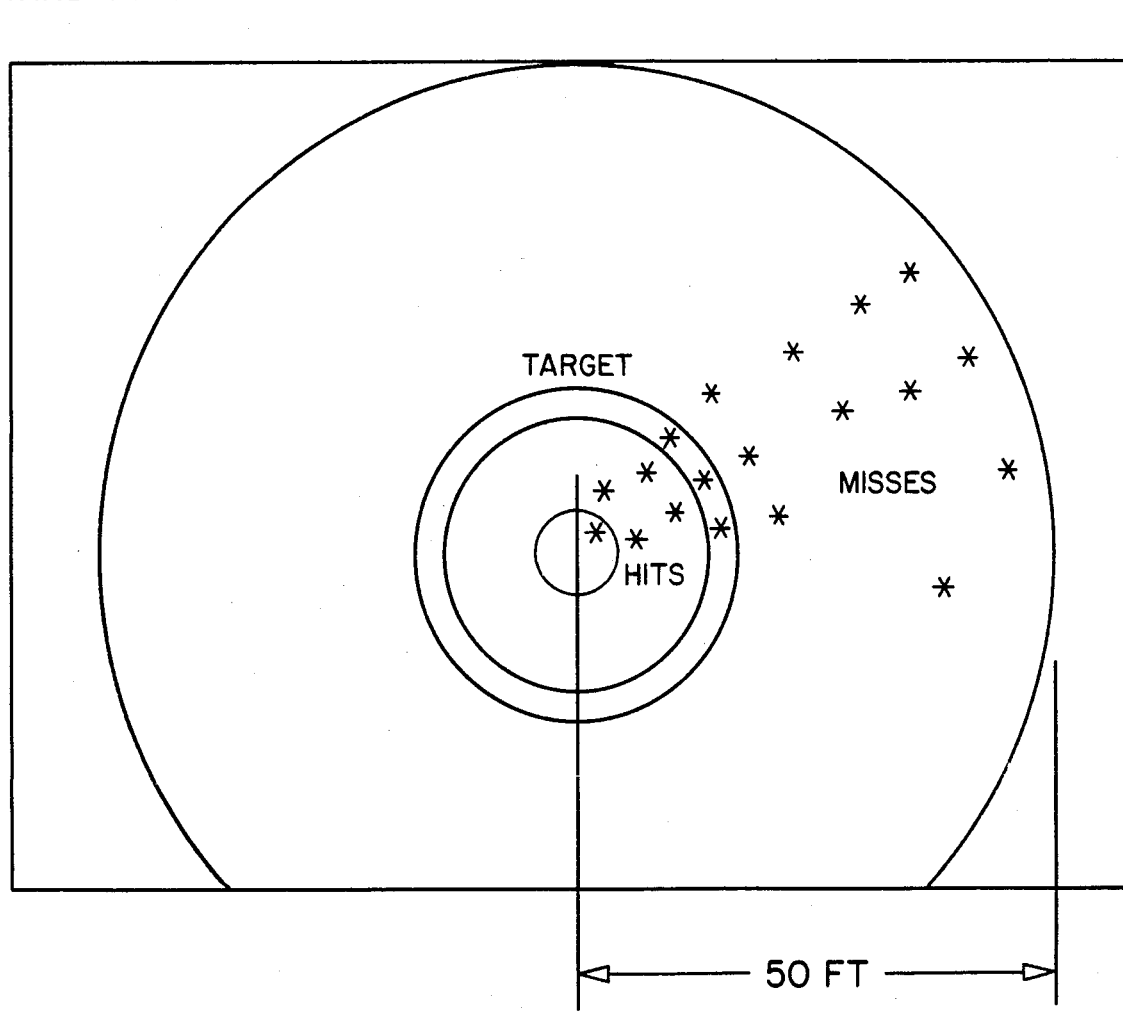
FIG. 9 illustrates a CRT display or paper print out of the results of a strafe.

Upon completion of the foregoing data processing of vector and C/F sensor signals, a printout and/or CRT display of each strafe is made in the format of FIG. 9 where the target is indicated along with a fifty foot radius thereof. Shell penetrations, represented as astericks, are accurately determined as hits on the target or as near misses if within the fifty foot radius. Outside the fifty foot radius, rounds are not scored or displayed.

Although a particular embodiment of the invention has been illustrated and described, it is understood that obvious modifications and alterations of components thereto within the ambit of the disclosure and claims is anticipated. It is intended therefore that the following claims be interpreted to cover all such modifications which fall within the spirit and scope of the invention.

What is claimed is:

1. A Remote Strafe Scoring System for a line air to ground strafing range for determining target penetration points of shells fired from an aircraft and for determining said aircraft cease-fire (C/F) distance, comprising:
    a left range adjacent a right range, each said range having a target plane situated at one end thereof and a C/F line at an opposite end thereof parallel to said target plane;
    an inner target and an outer target positioned in said target plane in each said left and said right ranges;
    a high quadrant and low quadrant associated with each said target;
    a vector sensor pair associated with each said target, consisting of a high vector sensor adjacent a low vector sensor positioned parallel to and to one side of each said target, wherein said high vector sensor is slightly separated from and slightly elevated from said low vector sensor;
    range selector means for activating said vector sensor pairs in said left range and said right range;
    at least one near C/F sensor positioned between said left and said right ranges and inside (between) said C/F line and said target plane;
    a signal processing unit remotely coupled to each said sensor; and
    a range control and display unit coupled to said signal processing unit.

2. A Remote Strafe Scoring System according to claim 1, further having at least one far C/F sensor positioned between said left and said right ranges and outside said C/F line.

3. A Remote Strafe Scoring System according to claim 1, wherein all said sensors are acoustic sensors.

4. A Remote Strafe Scoring System according to claim 1, wherein said signal processing unit includes at least one vector processing circuit and at least one C/F processing circuit.

5. A vector processing circuit accordin to claim 4 further including:
    a first, second, third and fourth wire malfunction detectors coupled through said range selector means to said inner target high and low vector sensors and said outer target high and low vector sensors, respectively, in said left and right ranges;
    a first, second, third and fourth programmable amplifiers coupled through said range selector means to said inner target high and low vector sensors and said outer target high and low vector sensors, respectively, in said left and right ranges;
    a first, second, third and fourth programmable threshold detectors coupled to said first, second, third and fourth programmable amplifiers, respectively;
    a first, second, third and fourth one-shot digitizing circuits coupled to said first, second, third and fourth programmable threshold detectors, respectively;
    inner/outer target detector means coupled to said first and to said third one-shot digitizing circuits;
    inner/outer target selector means coupled to:
        said inner/outer target detector means;
        said first, second, third and fourth one-shot digitzing circuits; and
        said second and fourth programmable amplifiers;
    a peak holder coupled through said inner/outer target selector means to said second programmable amplifier and said fourth programable amplifiers;
    high/low guadrant detector means coupled through said inner/outer target selector means to said second and said fourth one-shot digitizing circuits;
    window generator means coupled through said inner/outer target selector means to said first and said third one-shot digitizing circuits;
    a vector digital input/output (I/O) circuit coupled to:
        said high/low quadrant detector means;
        said first, second, third and fourth programmable threshold detectors; and
        said first, second, third and fourth programmable amplifiers;
    an analog to digital (A/D) convertor coupled to said peak holder;
    a vector timing circuit coupled to said window generator;
    a vector central processing unit (CPU) coupled to:
        said vector digital I/O;
        said A/D convertor; and
        said vector timing circuit; and
    a data display output coupled to said vector CPU.

6. A Remote Scoring System for a line aircraft strafing range for determining target penetration points of shells fired from an aircraft and for determining said aircraft cease-fire range, comprising:
    target means;
    means in combination with said target mens for determining a polar radius vector (distance and angle) of a shell penetration of a defined area within and around said target means;
    means in combination with said target means for determining a cease-fire distance of said aircraft from said target means upon cessation of strafing; and means for processing and displaying said polar radius vector means information and said cease-fire distance means information.

7. A Remote Scoring System according to claim 6, wherein said polar radius vector means utilizes a penetrating shell shock wave amplitude to determine said polar radius vector distance, and said shock wave time of arrival differential between two points to determine said polar radius vector angle.

8. A Remote Scoring System according to claim 7, wherein said cease-fire distance means utilizes a single point time of arrival differential between a fired shell shock wave and its respective muzzle blast sound wave from said aircraft to determine said cease-fire distance.

9. A Remote Scoring System for a live aircraft strafing range for determining target penetration points of shells fired from an aircraft and for determining said aircraft cease-fire range, comprising the steps of:
  determining a polar radius vector distance from a target penetrating shell shock wave amplitude;
  determining a polar radius vector angle from a time of arrival of said penetrating shell shock wave at two different points;
  determining said aircraft cease-fire range from a time of arrival difference between a fired shell shock wave and a sound wave of the respective muzzle blast; and
  processing and displaying said polar radius vector distance and angle along with said cease-fire range on a remote monitor.

10. A Remote Strafe Scoring System for a live air to ground strafing range for determining target penetration points of shells fired from an aircraft and for determining said aircraft cease-fire distance, comprising:
  a left range adjacet a right range, each said range having a target plane situated at one end thereof and a cease-fire line at an opposite end thereof parallel to said target plane;
  an inner target and an outer target positioned in said target plane in each said left and said right ranges;
  a high quadrant and a low quadrant associated with each said target;
  an acoustic vector sensor pair associted with each said target, consisting of a high vector sensor adjacent a low vector sensor positioned parallel to and to one side of each said target, wherein said high vector sensor is slightly separated from and slightly elevated from said low vector sensor;
  range selector means for activating said vector sensor pairs in said left range and said right range;
  a near cease-fire acoustic sensor positioned between said left and said right ranges and inside, between, said cease-fire line and said target plane;
  a far cease-fire acoustic sensor positioned between said left and said right ranges and outside said cease-fire line;
  a signal processing unit remotely coupled to each said sensor and containing a vector processing circuit and a cease-fire processing circuit;
  a range control and display unit coupled to said signal processing unit;
  said vector processing circuit of said signal processing unit further including:
    range selector means coupled to each said vector sensor pairs;
    a first, second, third and fourth wire malfunction detectors coupled through said range selector means to said inner target high and low vector sensors and said outer target high and low vector sensors, respectively, in said left and right ranges;
    a first, second, third and fourth programmable amplifiers coupled through said range selector means to said inner target high and low vector sensors and said outer target high and low vector sensors, respectively, in said left and right ranges;
    a first, second, third and fourth programmable threshold detectors coupled to said first, second third and fourth programmable amplifiers, respectively;
    a first, second, third and fourth one-shot digitizing circuits coupled to said first, second, third and fourth programmable threshold detectors, respectively;
    inner/outer target detector means coupled to said first and to said third one-shot digitizing circuits;
    an inner/outer target selector means coupled to:
      said inner/outer target detector means;
      said first, second, third and forth one-shot digitizing circuits; and
      said second and fourth programmable amplifiers;
    a peak holder coupled through said inner/outer target selector means to said second and said fourth programmable amplifiers;
    high/low guadrant detector means coupled through said inner/outer target selector means to said second and said fourth one-shot digitizing circuits;
    window generator means coupled through said inner/outer target selector means to said first and said third one-shot digitizing circuits;
    a vector digital input/output circuit coupled to:
      said high/low quadrant detector means;
      said first, second, third and fourth programmable threshold detectors; and
      said first, second, third and fourth programmable amplifiers;
    an analog to digital convertor coupled to said peak holder;
    a vector timing circuit coupled to said window generator;
    a vector central processing unit coupled to:
      said vector digital input/output;
      said analog/digital convertor; and
      said vector timing circuit;
  said cease-fire processing circuit of said signal processing unit further including:
    a first and second cease-fire malfunction detectors coupled to said near and far cease-fire sensors, respectively;
    a first and second cease-fire programmable amplifiers coupled to said near and far cease-fire sensors, respectively;
    a first and second anti-aliasing filters coupled to said first and second programmable amplifiers, respectively;
    a first and second shock wave digitizing circuits coupled to said first and second anti-aliasing filters, respectively;
    a first and second muzzle blast digitizing circuits coupled to said first and second anti-aliasing filters, respectively;

a digital signal processing sampler coupled to:
  said first and second shock wave digitizing circuits; and
  said first and second muzzle blast digitizing circuits;
a cease-fire timing circuit coupled to said digital signal processing sampler;
a cease-fire central processing unit coupled to:
  said digital signal processing sampler; and
  said cease-fire timing circuit;
a cease-fire digital input/output coupling said cease-fire central processing unit to said first and second cease-fire programmable amplifiers; and
a joint central processing unit communicating circuit coupling said cease-fire processing circuit to said vector processing circuit.

* * * * *